United States Patent

Matsuo et al.

[15] 3,646,404
[45] Feb. 29, 1972

[54] SOLID-STATE ELECTROLYTIC CAPACITOR AND METHOD OF MAKING SAME

[72] Inventors: Masao Matsuo, Takarazuka; Hiroshi Tomiwa, Osaka, both of Japan

[73] Assignee: Matsuo Electric Company, Limited, Osaka-fu, Japan

[22] Filed: Jan. 13, 1971

[21] Appl. No.: 106,172

[52] U.S. Cl. ............................................317/230, 29/570
[51] Int. Cl. ..........................................................H01g 9/05
[58] Field of Search ....................317/230, 231, 233; 29/570, 29/25.41

[56] References Cited

UNITED STATES PATENTS

| | | |
|---|---|---|
| 3,349,294 | 10/1967 | Heinimann et al.......................317/230 |
| 3,412,444 | 11/1968 | Klein...................................317/230 X |
| 3,403,303 | 9/1968 | Klein ......................................317/230 |
| 3,530,342 | 9/1970 | Klein .....................................317/230 |

*Primary Examiner*—James D. Kallam
*Attorney*—Eugene E. Geoffrey, Jr.

[57] ABSTRACT

The method of making a capacitor by forming a piece of sheet metal to provide a common support and alternate anode and cathode members extending from the support, electrically connecting capacitor elements between each of said anode and cathode members, coating the individual elements and at least part of the anode and cathode members with a plastic resin and then severing the members from the common support and the resulting capacitor which has the terminals extending therefrom in substantially parallel relationship.

6 Claims, 10 Drawing Figures

INVENTORS
MASAO MATSUO
HIROSHI TOMIWA
BY
ATTORNEY

SOLID-STATE ELECTROLYTIC CAPACITOR AND METHOD OF MAKING SAME

This invention relates to a solid-state electrolytic capacitor, especially a resin-coated solid-state electrolytic capacitor having flat conductors extending in the same direction and a method of manufacturing the same.

A conventional resin-coated solid state electrolytic capacitor is composed of a capacitor element, a pair of lead conductors bonded thereto and a synthetic resin package enclosing the capacitor element and a part of the lead conductors. The capacitor element is generally formed by electrolytically oxidizing the surface of an anode electrode, which is made of a wire or a plate of film-forming metal such as tantalum, niobium or aluminum or a sintered body of powder of such metal, to form a dielectric oxide layer thereon, and then forming further a semiconductor layer of manganese dioxide and a cathode layer of carbon and/or silver in turn thereon. The capacitor element is provided with a leadout wire made of the same metal as the anode electrode and welded to or embedded in the anode electrode before it is electrolytically oxidized. It is a general practice that the anode conductor is welded to this leadout wire and the cathode conductor is soldered to the cathode layer of the element.

In the case of bonding the conductors to the element in mass production, the conductors are generally arranged in a suitable welding jig. However, since such conductors are generally consisting of thin wires such as of 0.3 to 0.6 millimeter diameter, they are often bent accidentally during handling. This has been a great barrier to automation of the processes such as welding, soldering and resin packaging, as well as to maintenance and improvement of geometrical accuracy and electrical fidelity of the products.

Therefore, a main object of this invention is to propose a structure and a method of manufacture of a resin-coated solid state electrolytic capacitor, from which the above-mentioned disadvantages are completely eliminated, and which are very suitable for mass production of such capacitors.

According to this invention, the anode and cathode conductors of the capacitor element are formed by punching or etching a sheet material of a metal, such as nickel, Kovar (trade name) or copper, which is suitable for welding and soldering. In the first step, a number of pairs of anode and cathode conductors are formed in a continuous pattern in which the respective conductors are integrally connected to a common weblike strip and extending to a same side of the trip and the anode and cathode conductors of the each pair and also the respective pairs are properly spaced from each other.

Each of the anode and cathode conductors has a widened portion provided for reinforcement of the conductor and improvement of resin holding, and this portion of the anode conductor has a projection for welding the lead wire of the capacitor element. The widened portions of the both anode and cathode conductors are interconnected by an integral bar in order to further reinforce the conductors and to keep the space therebetween accurately. This connecting bar is cut away after packaging process.

Then, capacitor elements are bonded to the respective pairs of conductors by welding the respective lead wires to the corresponding welding projections of the respective anode conductors and then dipping the assembly in a solder bath to solder the cathode conductors to the cathode layers of the respective elements. Thereafter, the assembly is dipped in a molten synthetic resin bath to form a resin package on the each element.

Other objects and features of this invention will be more clearly understood from the following description with reference to the accompanying drawings.

In the drawings.

Throughout the drawings, same reference numerals are given to like structural components.

Figure 1:
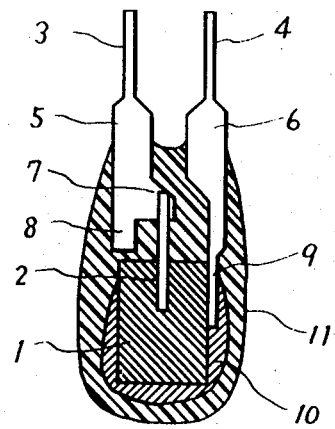
FIG. 1 is a cross-sectional view of an embodiment of a solid-state electrolytic capacitor according to this invention.

Referring to FIG. 1 representing a typical embodiment of the resin-coated solid state electrolytic capacitor according to this invention, there shown is a cylindrical capacitor element 1, having a diameter of about 3 millimeters and a height of about 5 millimeters, for example. The capacitor element 1 can be prepared by a well-known method from a sintered body of powdered film-forming metal, such as tantalum, niobium or aluminum which serves as the anode electrode of the capacitor. A leadout rod 2 of the same metal having a diameter of 0.3 to 0.6 millimeters, for example, is previously embedded in or welded to this body. The body is electrolytically oxidized to form an oxide layer on the whole surface thereof. Then a semiconductor layer of manganese dioxide and a cathode layer of carbon and/or silver are successively formed on the surface of the oxide layer. This is a well-known procedure for preparing the capacitor element 1 in the prior art and is not the part of this invention.

The capacitor element 1 is bonded to lead conductors 3 and 4 which include the subject matter of this invention. As will be described later, the both conductors 3 and 4 are made by simultaneous punching or etching of a strip of solderable metal, such as nickel, copper or Kovar (trade name), having a thickness of about 0.5 millimeters, for example. The width of the conductors 3 and 4 is about 0.5 millimeters, for example, but the lower portions 5 and 6 thereof are rather widened and have a width of about 1 millimeter. The widened portions 5 and 6 of the conductors 3 and 4 serve a function of reinforcing the conductors and holding molten resin. The widened portion 5 of the anode conductor 3 has a projection 7 extending toward the cathode conductor 4 and welded to the leadout rod 2 of the element 1, and a downward projection 8 for preventing the molten resin from being depressed at this portion. The widened portion 6 of the cathode conductor 4 has a projection 9 extending downwards and soldered to the surface, i.e., the cathode layer, of the element 1 with suitable solder 10. The assembly is enclosed by a synthetic resin coating 11, such as of epoxy resin, leaving a part of the widened portion of the each conductor.

Though, in the drawing, the widened portions 5 and 6 extend in the both sides of the conductors 3 and 4 respectively, they may extend in one side thereof as occasion demands, and the shoulders of the widened portions may be either squared or rounded. Such variations are all in the range of this invention.

Figure 2:
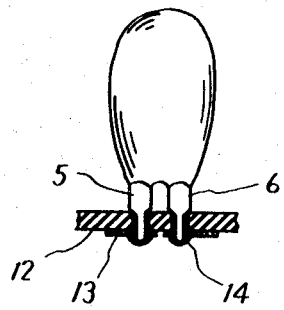
FIG. 2 is a view in partial section of the capacitor of FIG. 1 attached to a printed circuit board.

FIG. 2 shows the above capacitor which is attached to a printed circuit board 12. The conductors of the capacitor are soldered with suitable solder 14 to printed conductors 13 of the board 12. As shown in the drawing, the shoulders of the widened portions 5 and 6 serve as stoppers for keeping the height of the attached capacitor constant.

Now, the mass production procedure of such capacitors will be described in detail with reference to FIGS. 3 through 6.

Figure 3:
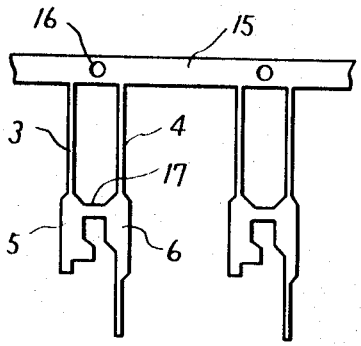
FIGS. 3 through 6 are partly broken away views representing successive steps of manufacturing the resin-coated solid-state electrolytic capacitor of FIG. 1.

At first, a thin solderable metal sheet, such as nickel, copper or Kovar (trade name), having a thickness of about 0.5 millimeters, for example, is punched or etched into a pattern as shown in FIG. 3. In the pattern, a long continuous trunk strip 15 is provided and a plurality of branches extend at a constant interval from one side of the trunk strip 15. Each of the branches includes a pair of conductors 3 and 4 extending substantially perpendicularly to the trunk strip 15. The conductors 3 and 4 correspond to those in FIG. 1 and have widened portions 5 and 6 also corresponding to those in FIG. 1. The widened portions 5 and 6 also have various projections corresponding to those 7, 8, and 9 in FIG. 1.

The upper ends of the widened portions 5 and 6 of the both conductors 3 and 4 are bridged by a bridge strip 17 which is integral with these portions 5 and 6. The function of the bridge strip 17 is to reinforce the narrow conductors 3 and 4 so as not to be bent or deformed during the succee;ing steps of production. The trunk strip 15 has index holes 16 bored in correspondence with the respective branches for positioning or indexing the material as occasion demands.

Then, the conductors 3 and 4 are preferably plated with gold, silver, tin or solder for facilitating soldering and other bonding treatments.

Figure 4:
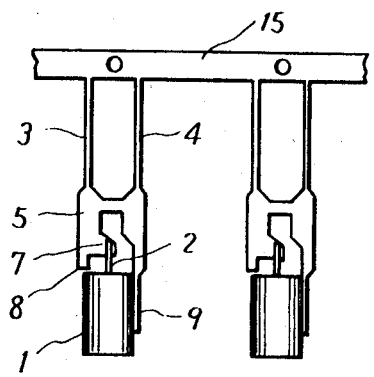

Next, as shown in FIG. 4, the capacitor element 1 having the leadout rod 2, which is previously prepared as aforementioned, is attached to the each anode conductor 3 by welding the leadout rod 2 to the projection 7. A suitable jig may be used for positioning the element 1 with respect to the conductors 3 and 4 so that the element 1 is appropriately spaced from the projection 8 and in contact with the projection 9.

Figure 5:
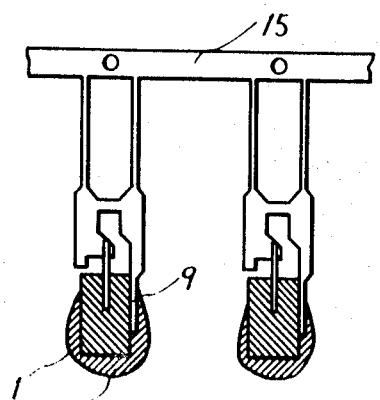

Then, the cathode layer of the element 1 is soldered to the projection 9 of the cathode conductor 4 by dipping about a half of the element together with the projection 9 in molten solder bath. In the resultant assembly, the most surface of the element 1 is coated with solder 10 as shown in FIG. 5.

Next, similar to the soldering step, the assembly is dipped in liquid electrically insulating synthetic resin, such as epoxy resin, to the middle of the widened portions 5 and 6 of the conductors 3 and 4 so that the bridge strip 17 is left above the liquid surface. Pulling up the assembly from the resin bath and then curing and hardening the resin according to a proper well-known schedule, an oval resin package 11 is obtained as shown in FIG. 6.

Since the widened portions 5 and 6 and the various flat projections of the conductors 3 and 4 well attract and hold the liquid resin, one dipping is enough to obtain a well-shaped resin package 11 if the concentration and viscosity of the liquid resin is appropriately controlled. On the contrary, according to the prior art, thin wirelike conductors could not hold a sufficient amount of resin in one dipping and therefore several times of dipping have been required in general for obtaining a well-shaped resin package.

Figure 6:
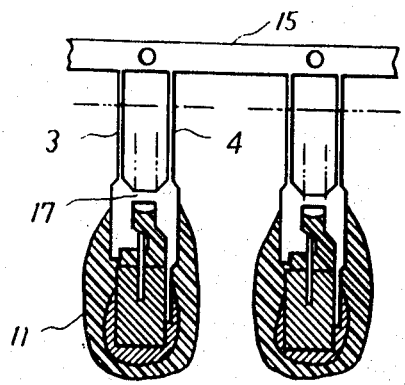

After applying a mark and other indications, the conductors 3 and 4 and the bridge strip 17 are cut off at the broken lines shown in FIG. 6 and a complete capacitor as shown in FIG. 1 is obtained.

The above-mentioned steps can be carried out according to a batch system as well as a continuous system. In the batch system, there is provided a limited length of the trunk strip 15 having a limited number of branches such as 10 or 20, and each of the above-mentioned steps is applied simultaneously to all of these branches belonging to this trunk strip 15. In the continuous system, however, the trunk strip 15 is generally very long and has a unlimited length and the number of branches is also unlimited. Stations for applying the abovementioned steps respectively to the material are arranged on a line and the branches pass successively the respective stations continuously and are applied with the corresponding treatments successively. These systems of production can be selected suitable as occasion demands and are not the subject matter of this invention.

Figure 8:
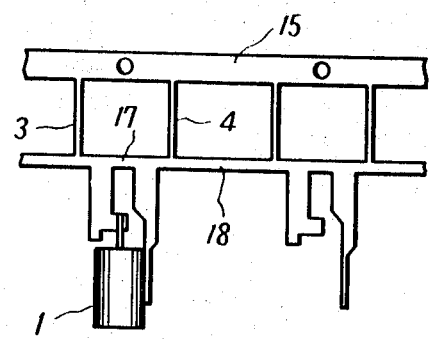
FIG. 8 is a partly broken-away view representing schematically steps of manufacturing the capacitor of FIG. 7.
Figure 7:
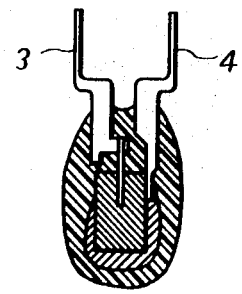
FIG. 7 is a cross-sectional view of another embodiment of a resin-coated solid-state electrolytic capacitor according to this invention.
Figure 10:
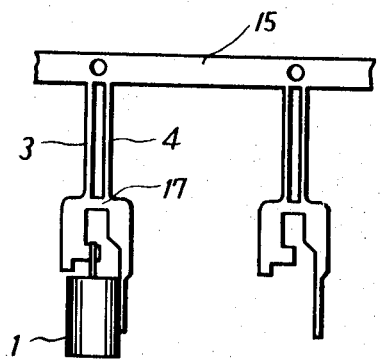
FIG. 10 is a partly broken-away view representing schematically steps of manufacturing the capacitor of FIG. 9.
Figure 9:
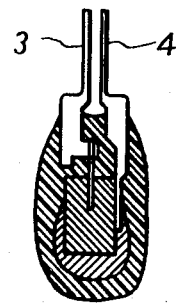
FIG. 9 is a cross-sectional view of a further embodiment of resin-coated solid-state electrolytic capacitor according to the invention.

FIGS. 7 and 9 show variations of the capacitor of FIG. 1 which respectively require wide and narrow gaps between the both conductors 3 and 4 for convenient use. These capacitors may be produced by use of the patterns as shown in FIGS. 8 and 10, respectively. In FIG. 8, a connection strip 18 is provided between the adjoining branches for further reinforcing the narrow conductors, in addition to the bridge strip 17.

As easily understood, according to this invention, improved geometrical accuracy, accordingly improved electrical quality, and reduced labor and cost of production can be obtained concurrently, contrary to the prior art wherein a number of thin wire conductors are worked, welded and soldered one by one generally by hand. Moreover, since the narrow conductors are reinforced by the widened portions and the bridge strips, the number of rejected products due to deformation of the conductors is reduced.

What is claimed is:

1. A method of manufacturing a resin-coated solid state electrolytic capacitor including a capacitor element comprising an anode of film-forming metal and successive coatings of an oxide dielectric layer, a semiconductor layer and a cathode layer thereon, with a leadout rod connected to said anode, and a pair of lead conductors, connected to said rod and cathode layer respectively, extending in a same direction, said method comprising: preparing a plurality of pairs of metal branches integral with and extending from one side of a metal strip with each of said branches having a relatively narrow portion near and a relatively wide portion remote from the strip, welding an end portion of said leadout rod of said capacitor element to the relatively wide portion of one of the branches in a pair of said conductors, soldering the wide portion of the other branch in said one of the pairs to said cathode layer, and applying a resin layer over said capacitor element, for forming a package around the element with said metal branches extending therethrough, and separating said metal branches from the metal strip whereby a pair of branches form lead conductors for the capacitor, with the relatively wide portions bonded thereto and the relatively narrow portions forming lead terminals therefor.

2. The method according to claim 1 including the steps of forming a bridge between each pair of said metal branches and removing said bridges upon securing said capacitor elements to said pairs of metal branches.

3. The method according to claim 1 including providing the wide portions of said other branches with longitudinal extensions and soldering said extensions to said cathode layers of said capacitor elements.

4. The method according to claim 1 including the step of forming index holes in said metal strip.

5. The method according to claim 1 including the steps of forming a bridge between the branches of each pair of branches and removing said bridges upon securing said capacitor elements to said pairs of metal branches.

6. A resin-coated solid-state electrolytic capacitor comprising an anode of film-forming metal and an electrolytic dielectric oxide film thereon, a layer of semiconductive electrolyte on said film, and a conductive cathode layer on the electrolyte layer, a leadout rod connected to said anode, a resin package enclosing said anode including said layers, a pair of spaced terminal lead conductors extending in the same direction, each of said conductors having a relatively narrow striplike portion and a relatively wide striplike portion with a greater length of the relatively wide portion embedded in the resin of the package, said wide portion of one of said conductors having a lateral portion with said leadout rod welded thereto said wide portion of the other of said lead conductors having a longitudinal projection soldered to said cathode layer whereby said terminal lead conductors are bonded to said capacitor.

* * * * *